F. N. ROEHRICH.
PRESS FOR MAKING GLASS INSULATORS.
APPLICATION FILED FEB. 5, 1908.

1,136,275.

Patented Apr. 20, 1915.
17 SHEETS—SHEET 2.

WITNESSES:
John O. Gempler
Sidney Mann

Frank N. Roehrich INVENTOR
BY his ATTORNEYS Kenyon & Kenyon

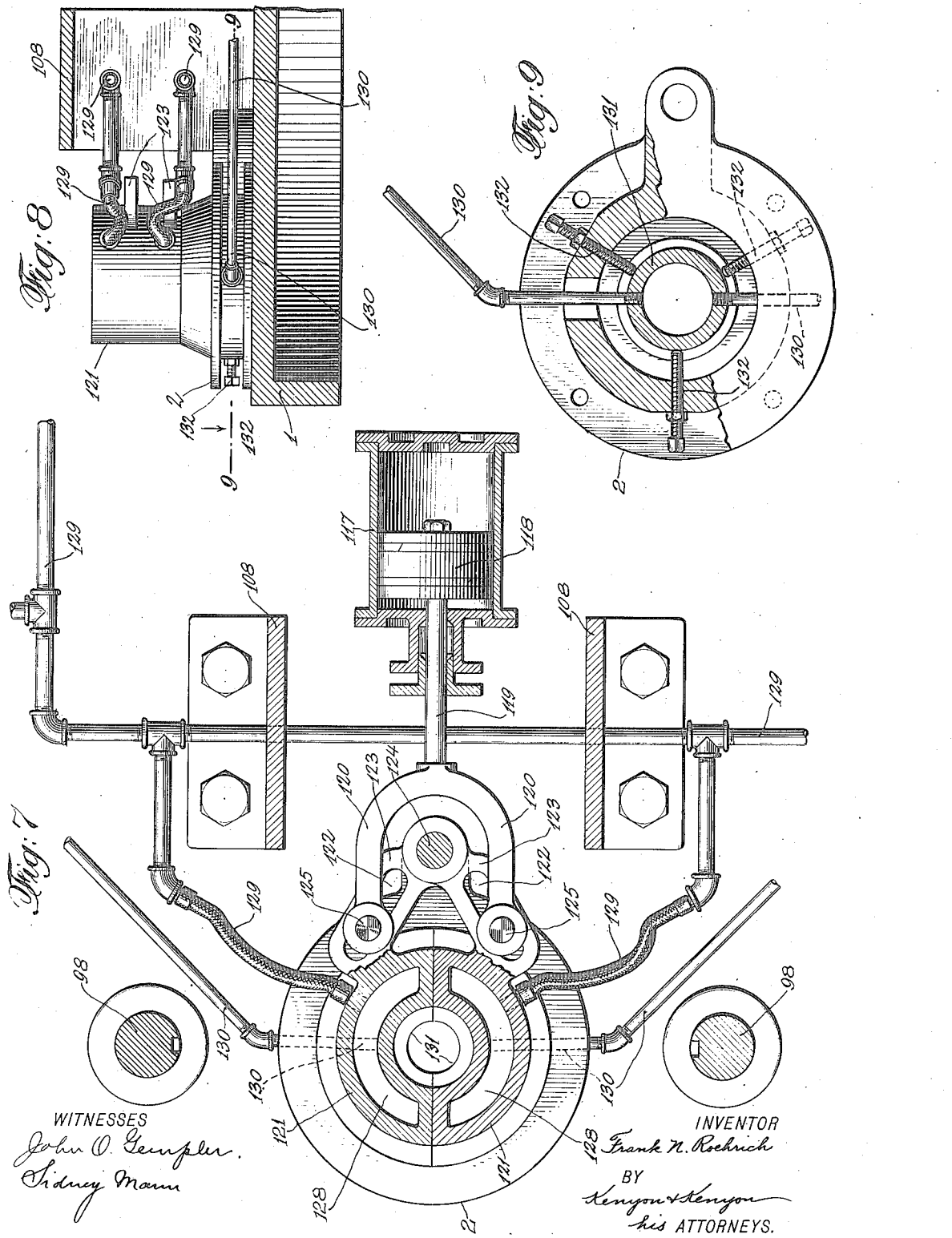

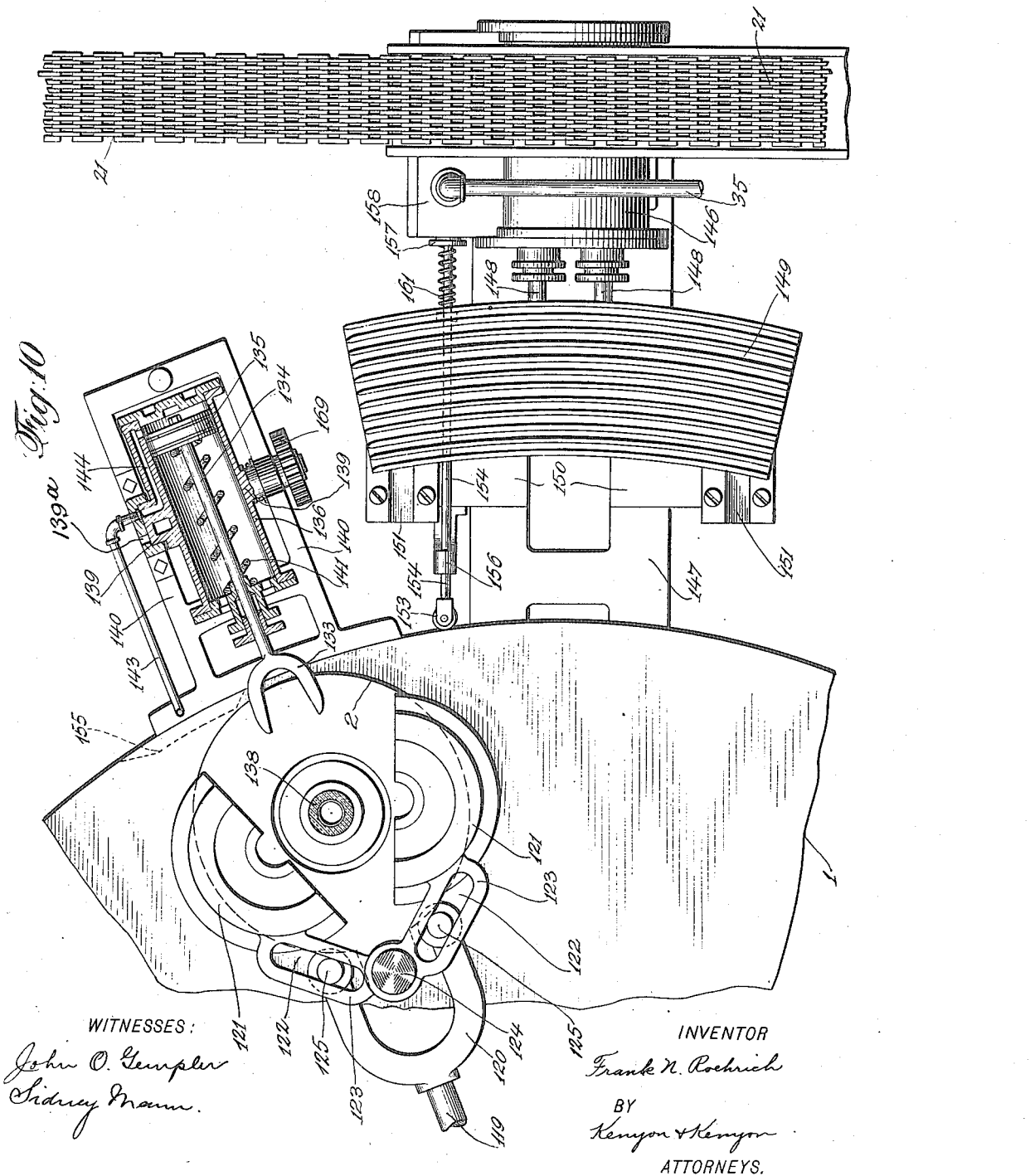

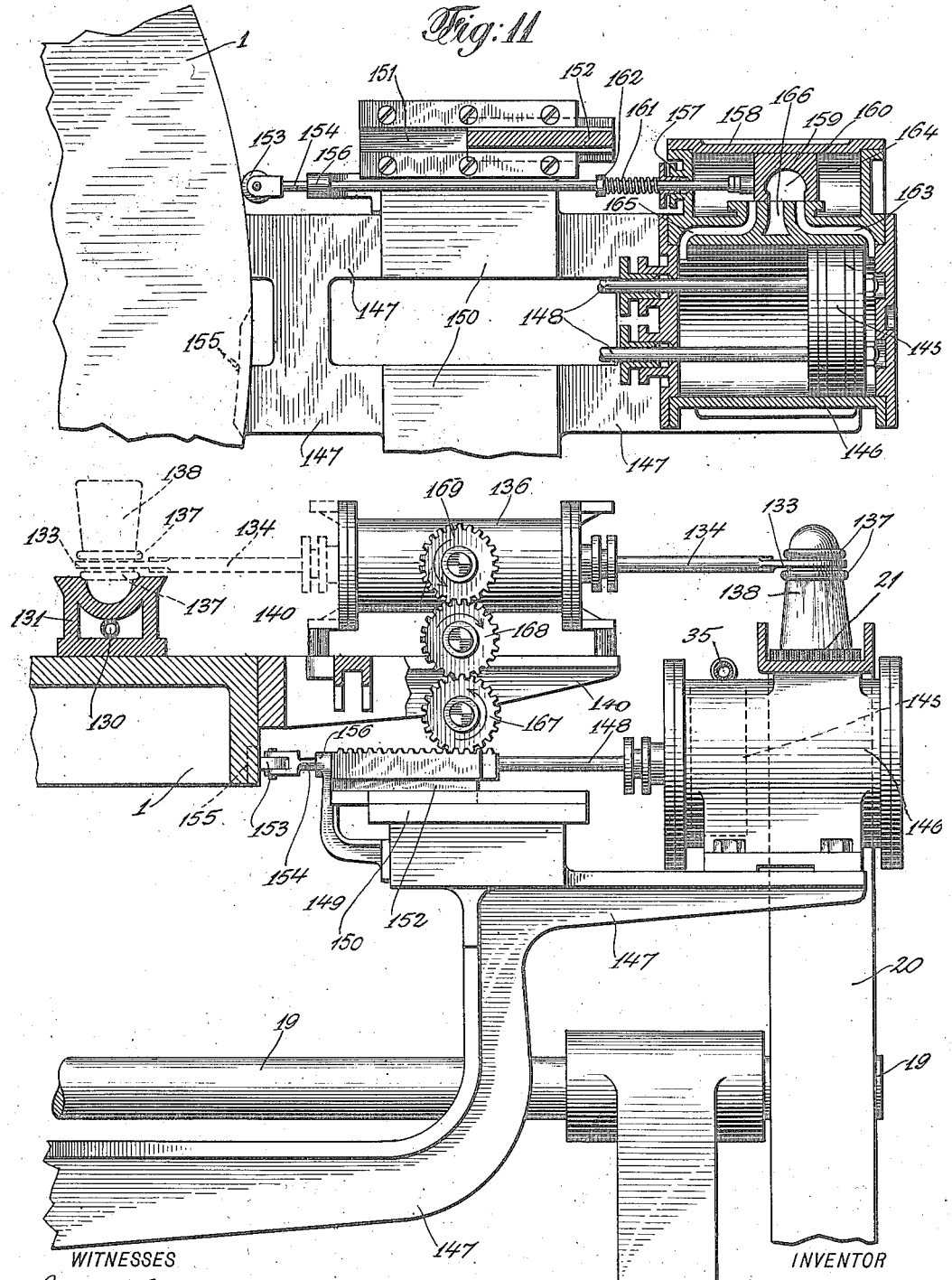

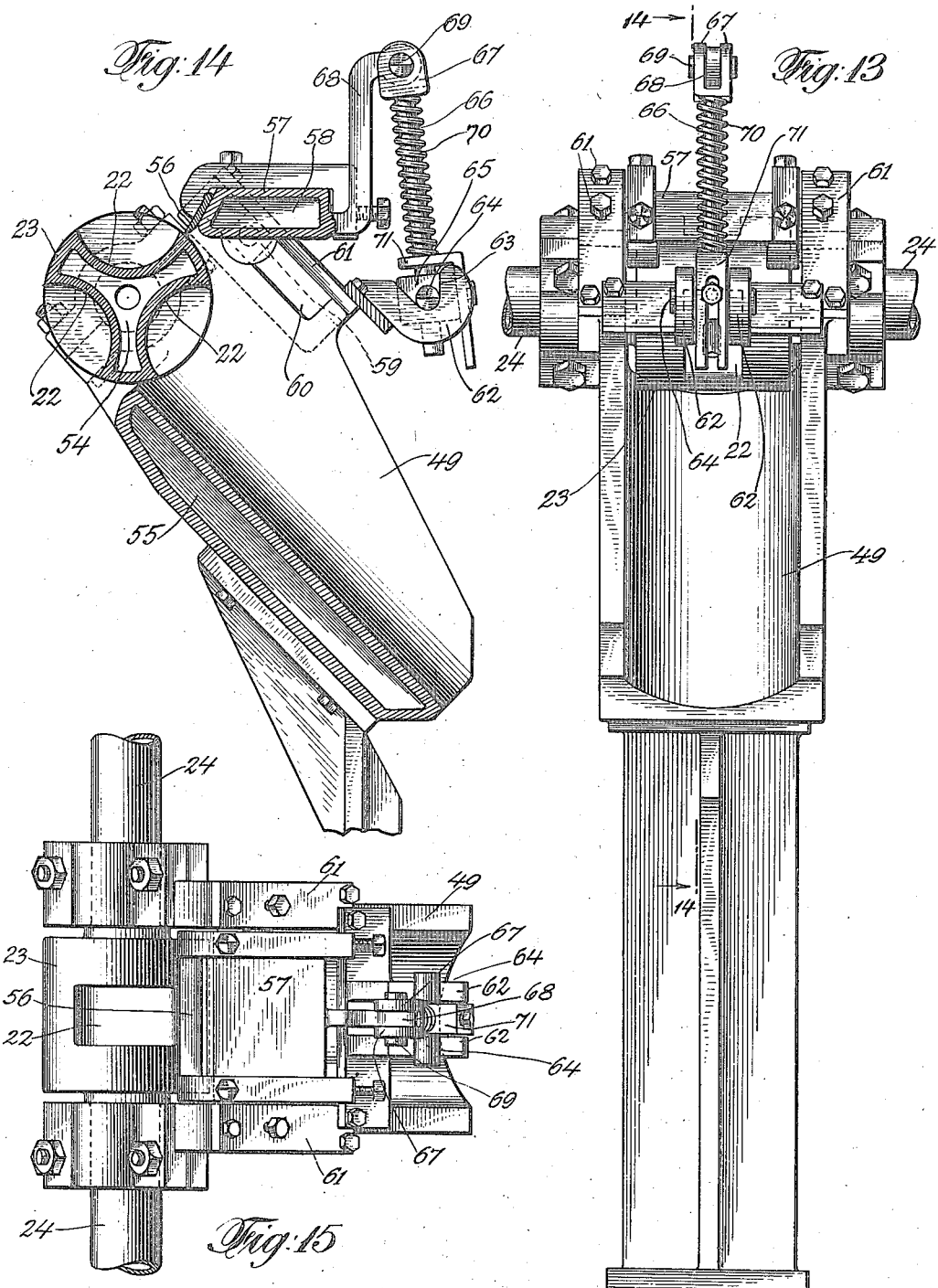

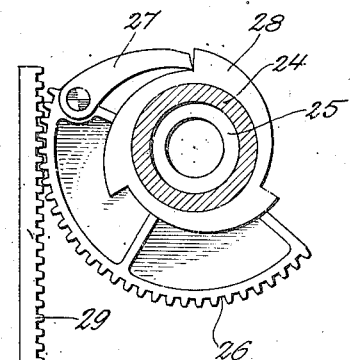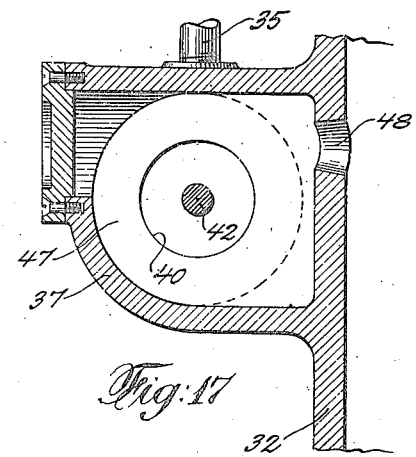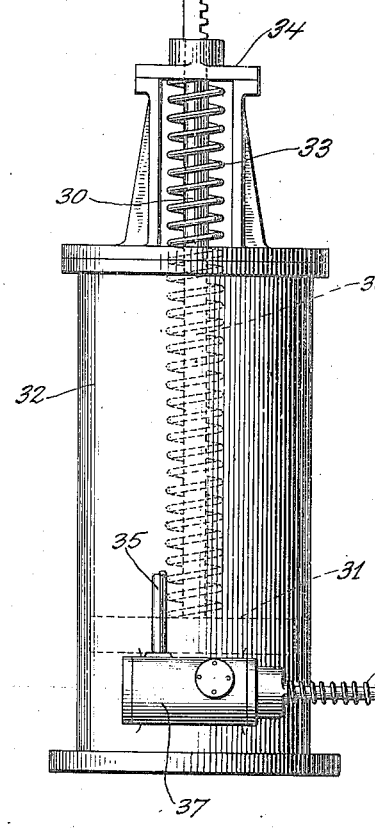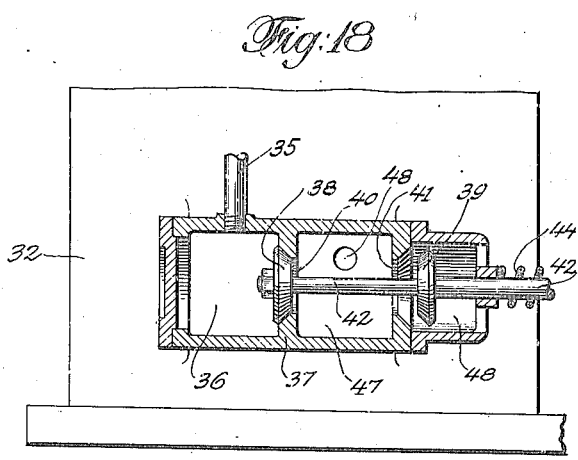

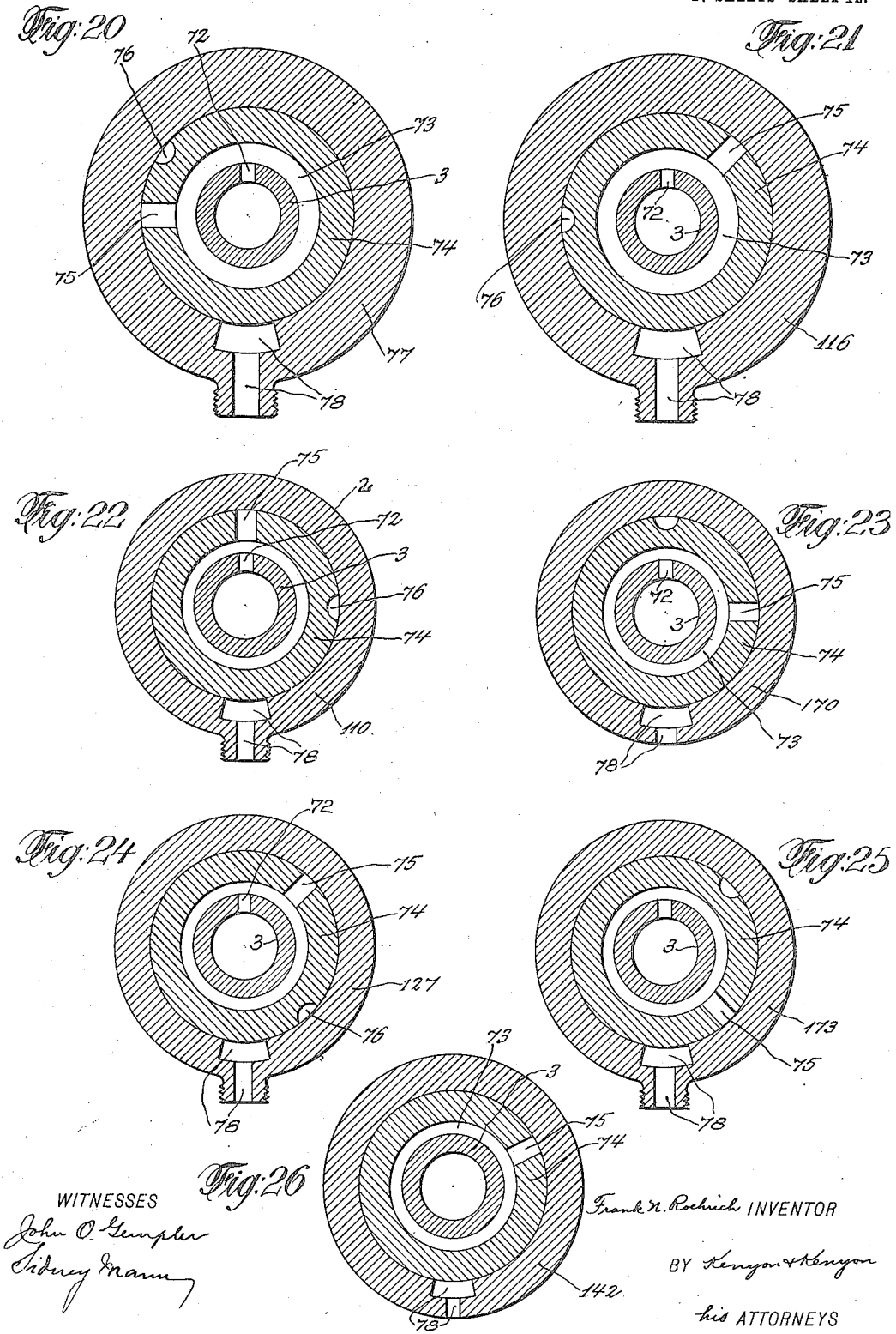

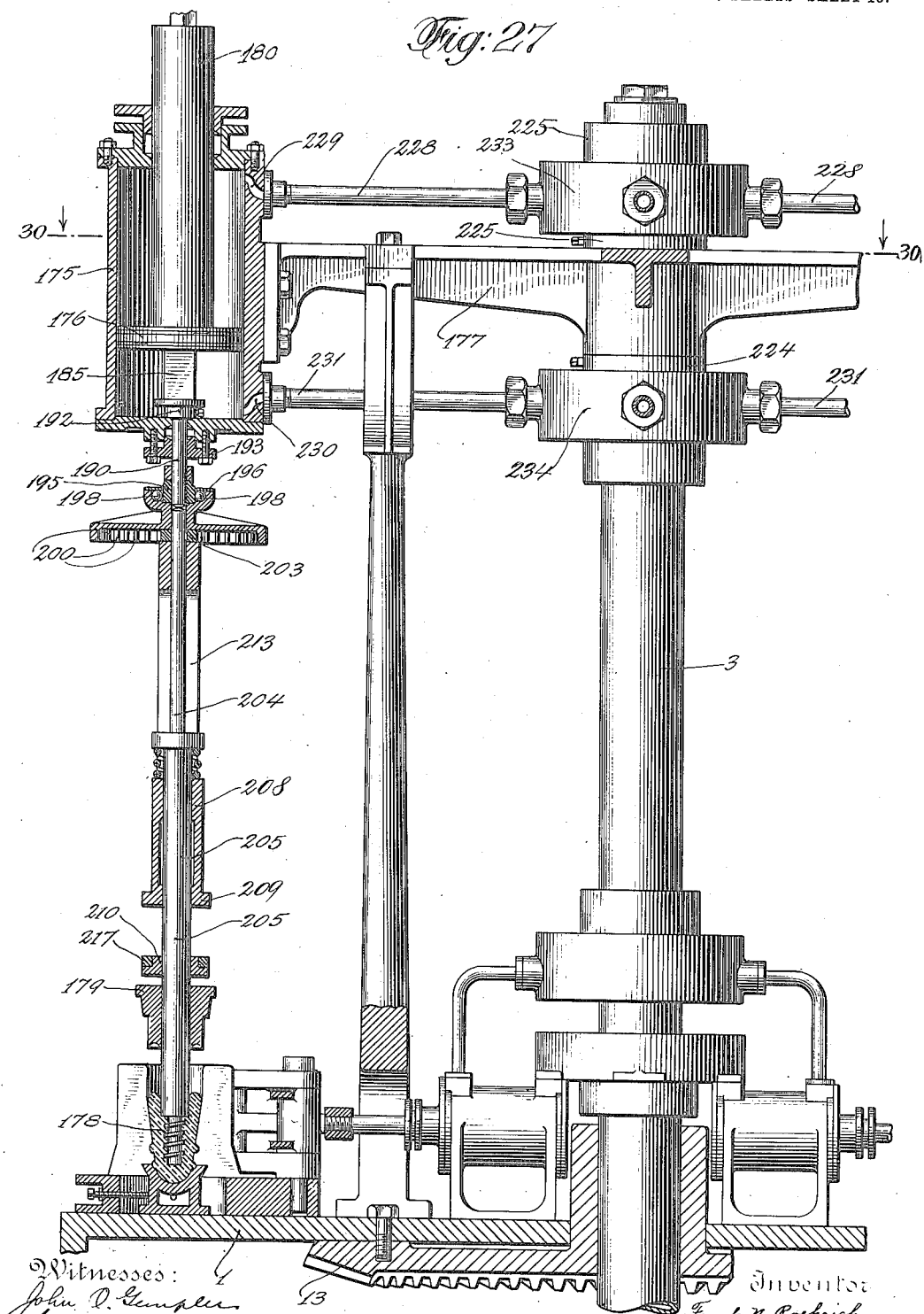

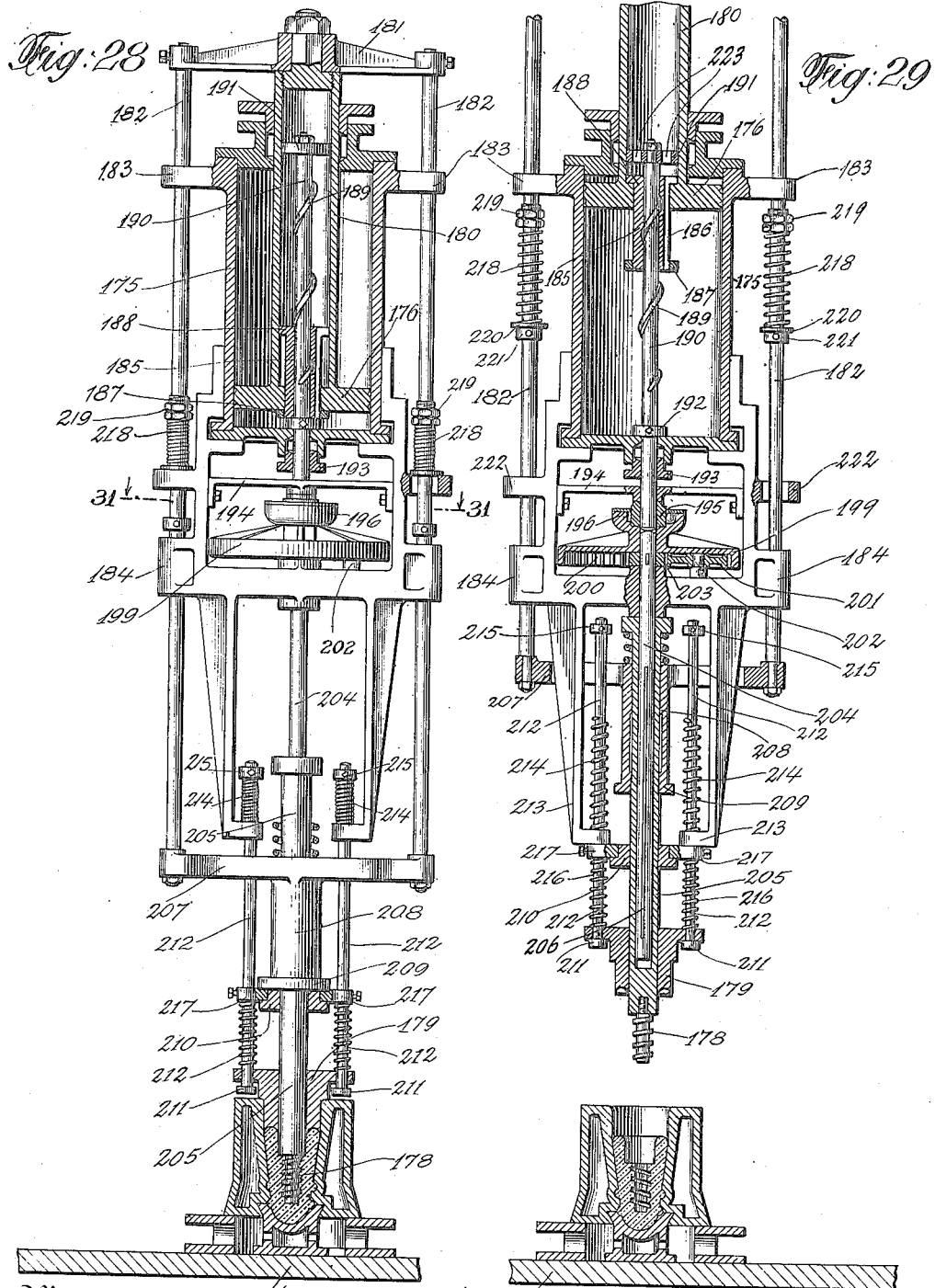

F. N. ROEHRICH.
PRESS FOR MAKING GLASS INSULATORS.
APPLICATION FILED FEB. 5, 1908.

1,136,275.

Patented Apr. 20, 1915.
17 SHEETS—SHEET 15.

Witnesses:
John O. Gempler
Sidney Mann

Frank N. Roehrich  Inventor
By his Attorneys Kenyon & Kenyon

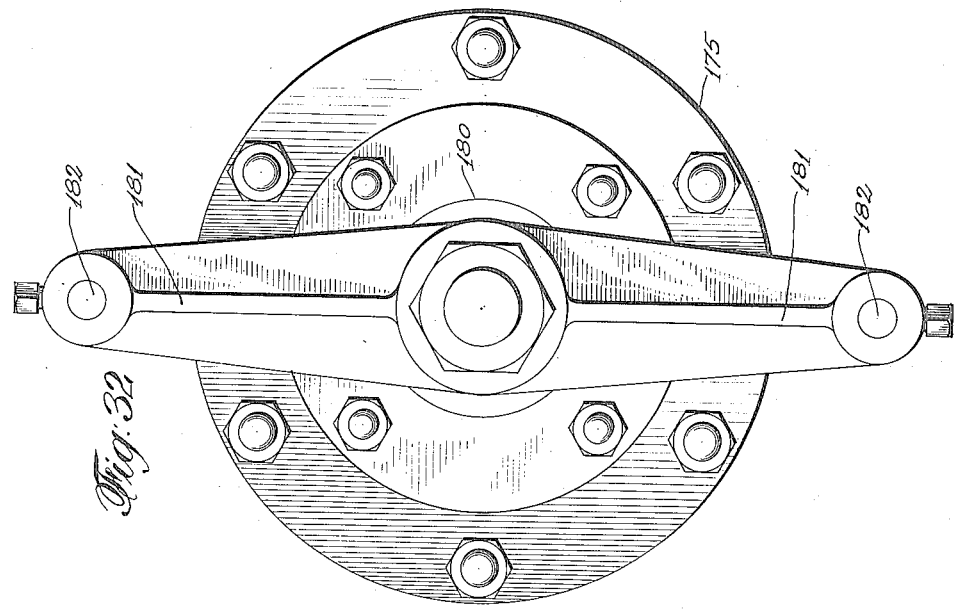
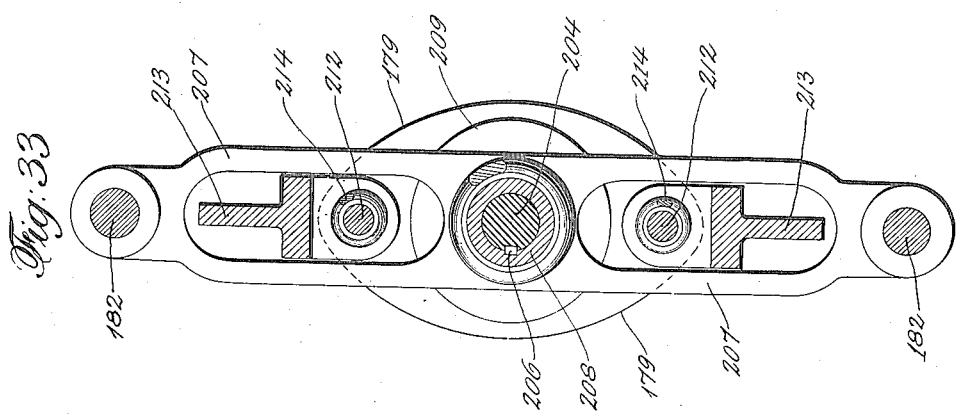

F. N. ROEHRICH.
PRESS FOR MAKING GLASS INSULATORS.
APPLICATION FILED FEB. 5, 1908.

1,136,275. Patented Apr. 20, 1915.
17 SHEETS—SHEET 17.

Witnesses:
John O. Templer
Sidney Mann

Frank N. Roehrich  Inventor
By his Attorneys Kenyon & Kenyon

UNITED STATES PATENT OFFICE.

FRANK N. ROEHRICH, OF BROOKLYN, NEW YORK, ASSIGNOR TO THE BROOKFIELD GLASS COMPANY, A CORPORATION OF NEW YORK.

PRESS FOR MAKING GLASS INSULATORS.

1,136,275. Specification of Letters Patent. Patented Apr. 20, 1915.

Application filed February 5, 1908. Serial No. 414,383.

*To all whom it may concern:*

Be it known that I, FRANK N. ROEHRICH, a citizen of the United States, and a resident of Brooklyn, in the county of Kings and State of New York, have invented certain new and useful Improvements in Presses for Making Glass Insulators, of which the following is a specification.

My invention relates to presses for making glass insulators.

It has for its object to improve the methods and apparatus used in making glass insulators; to provide a new and improved automatic press for that purpose, one actuated by a fluid, preferably air, under pressure; also to provide new and improved means for forcing the screw plunger into the molten glass in the molds to form glass insulators and for withdrawing it from the finished insulators, also new and improved means for removing the finished insulators from the press; and also generally to improve, simplify and perfect parts of presses for making glass insulators.

My invention consists of the novel devices and methods herein shown and described.

Figure 1:
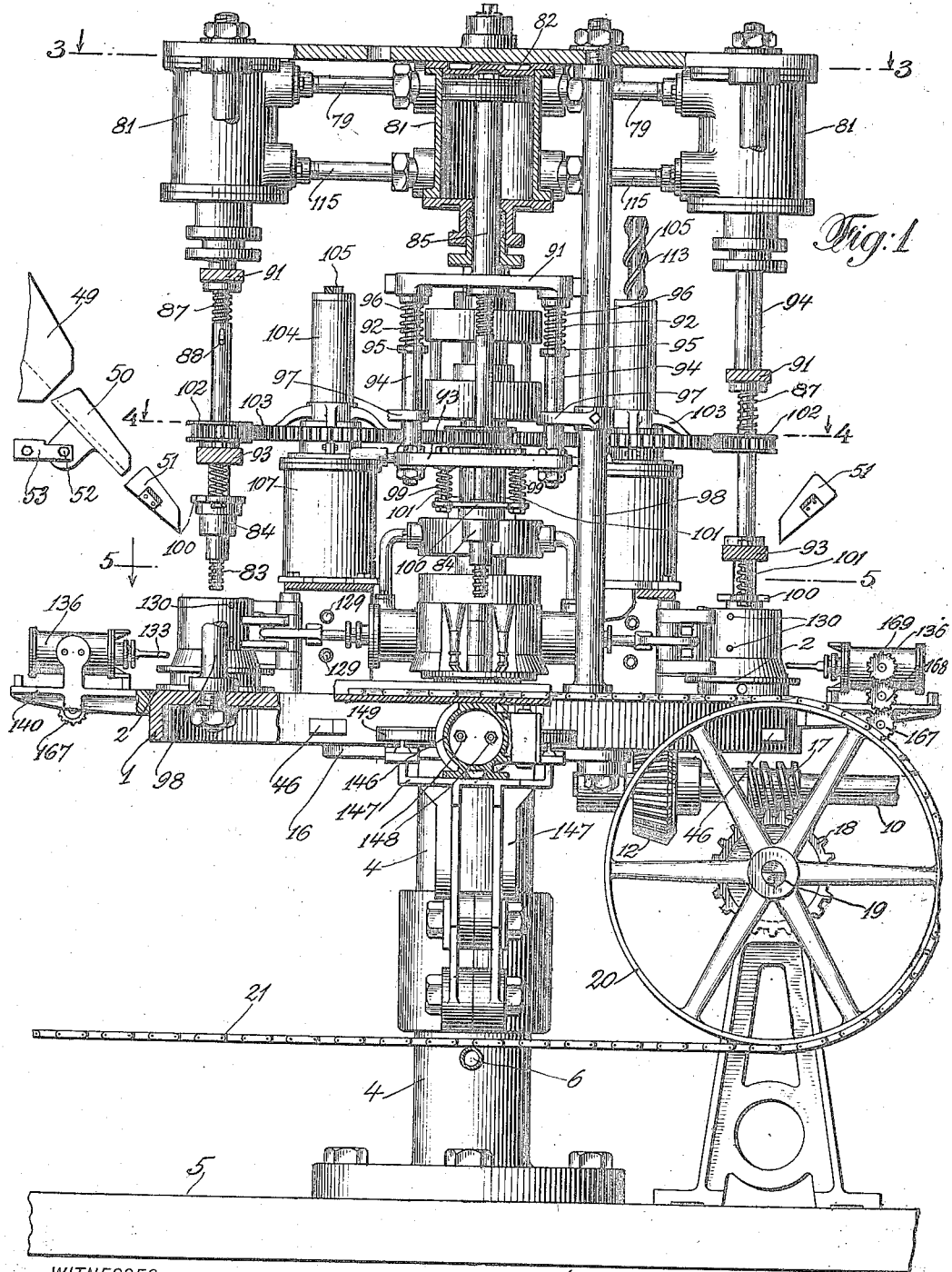
Figure 2:
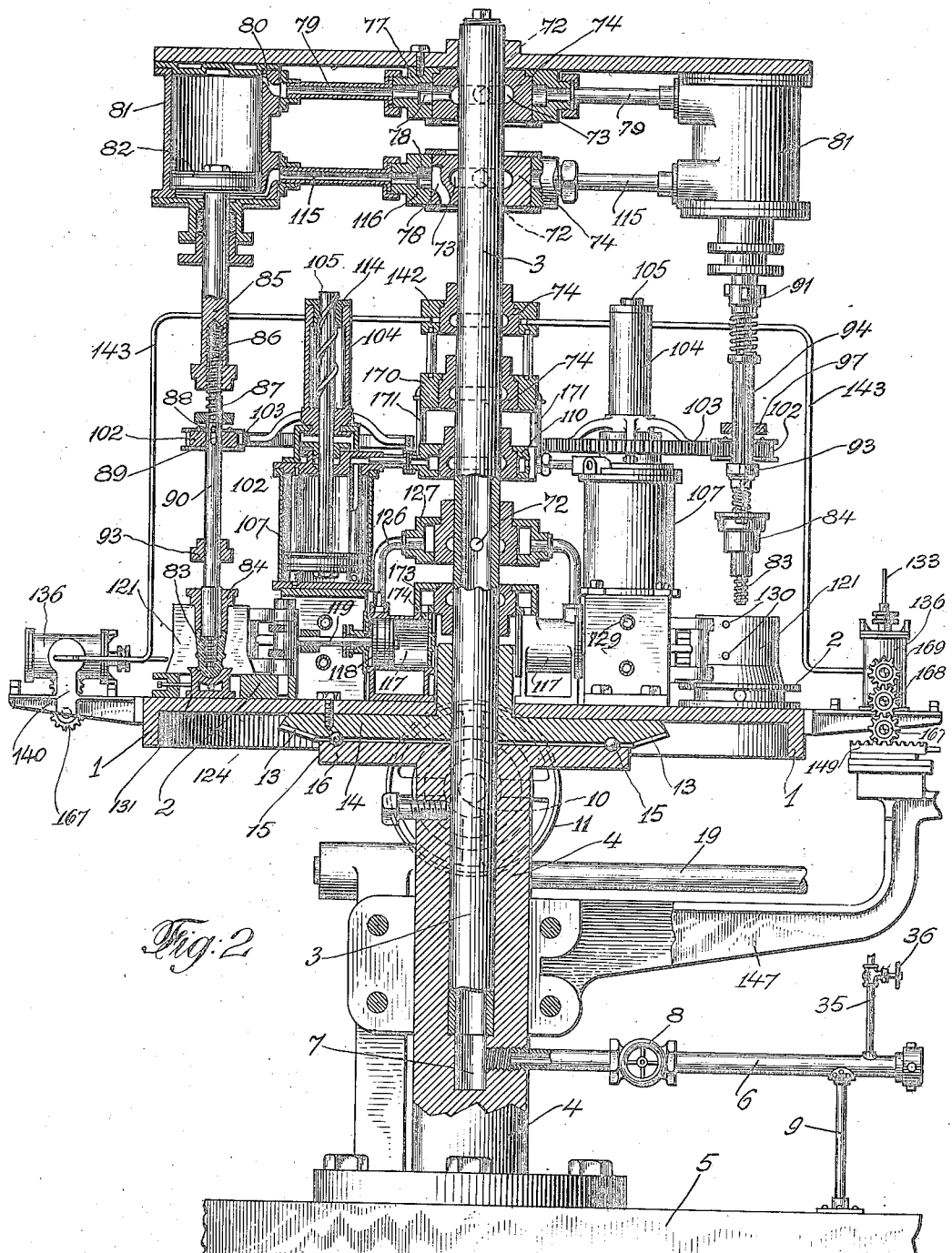
Figure 3:
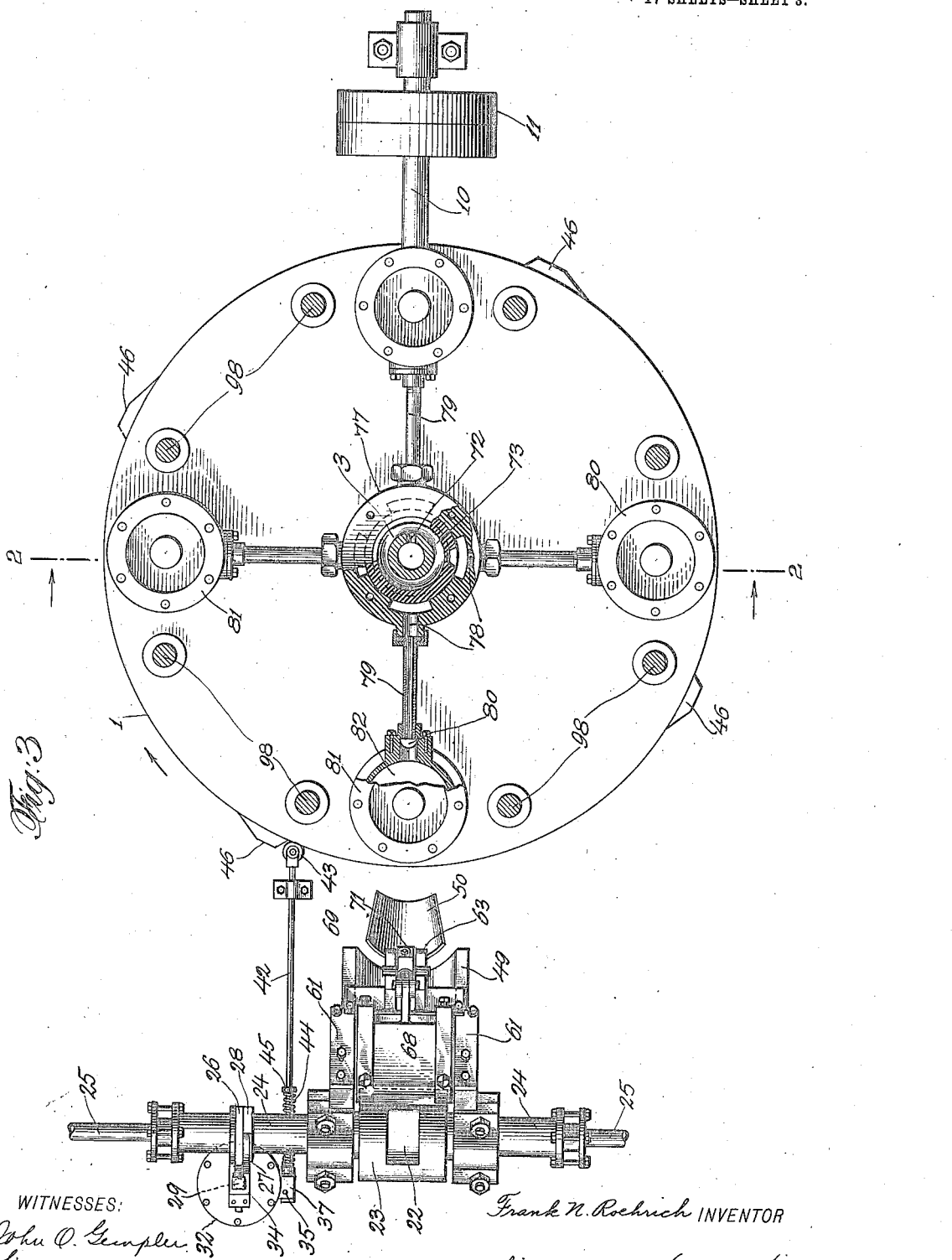
Figure 4:
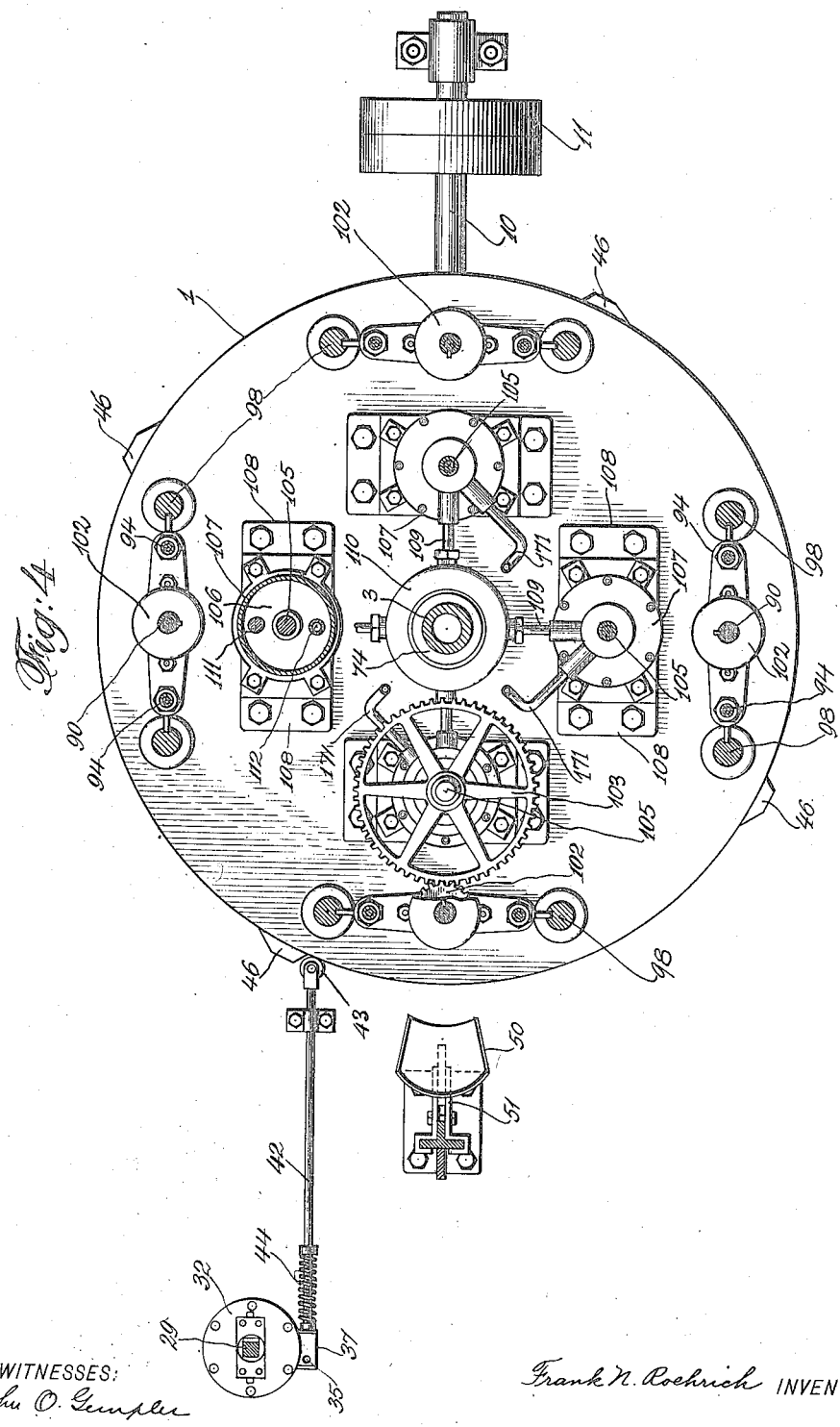
Figure 5:
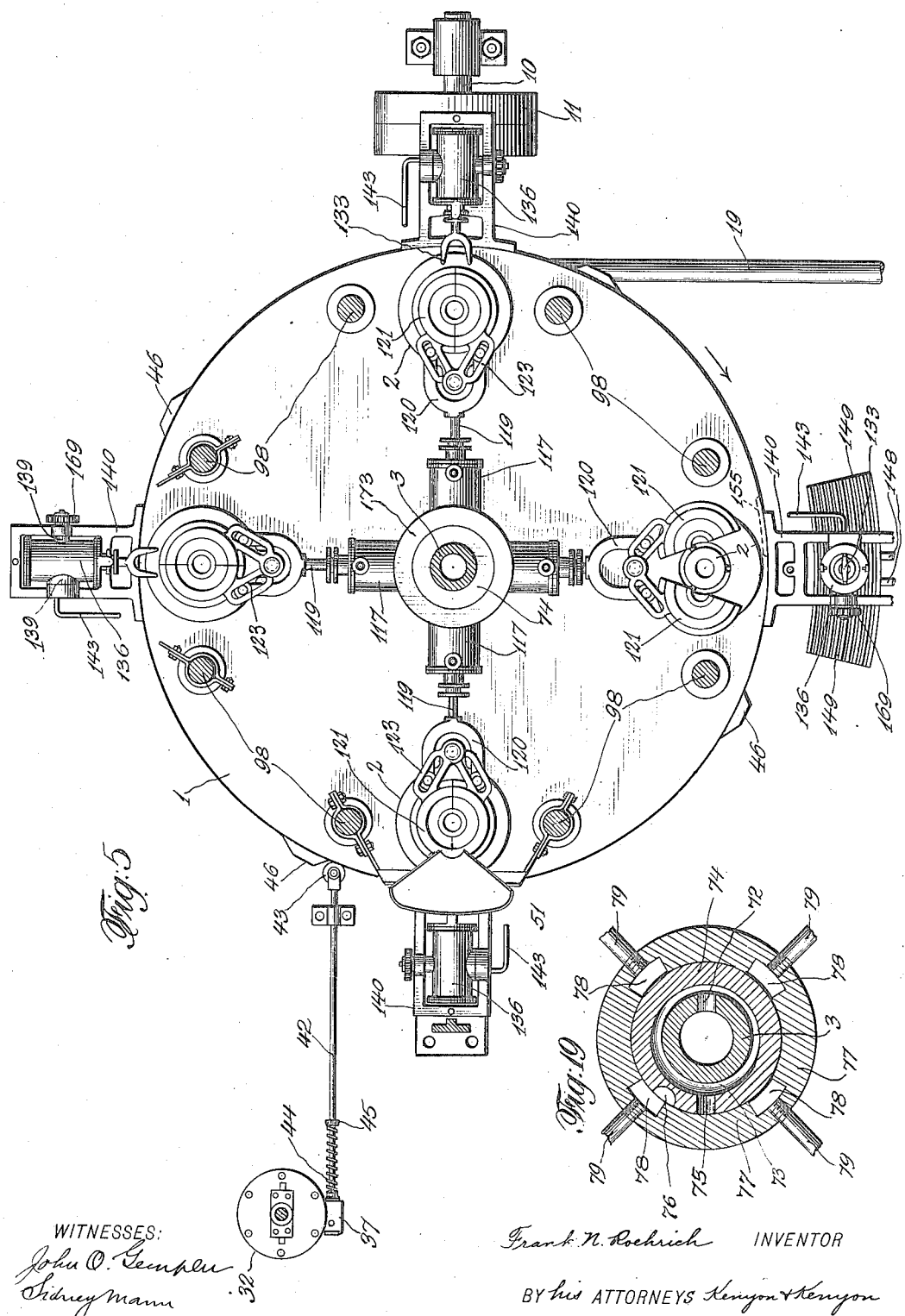
Figure 6:
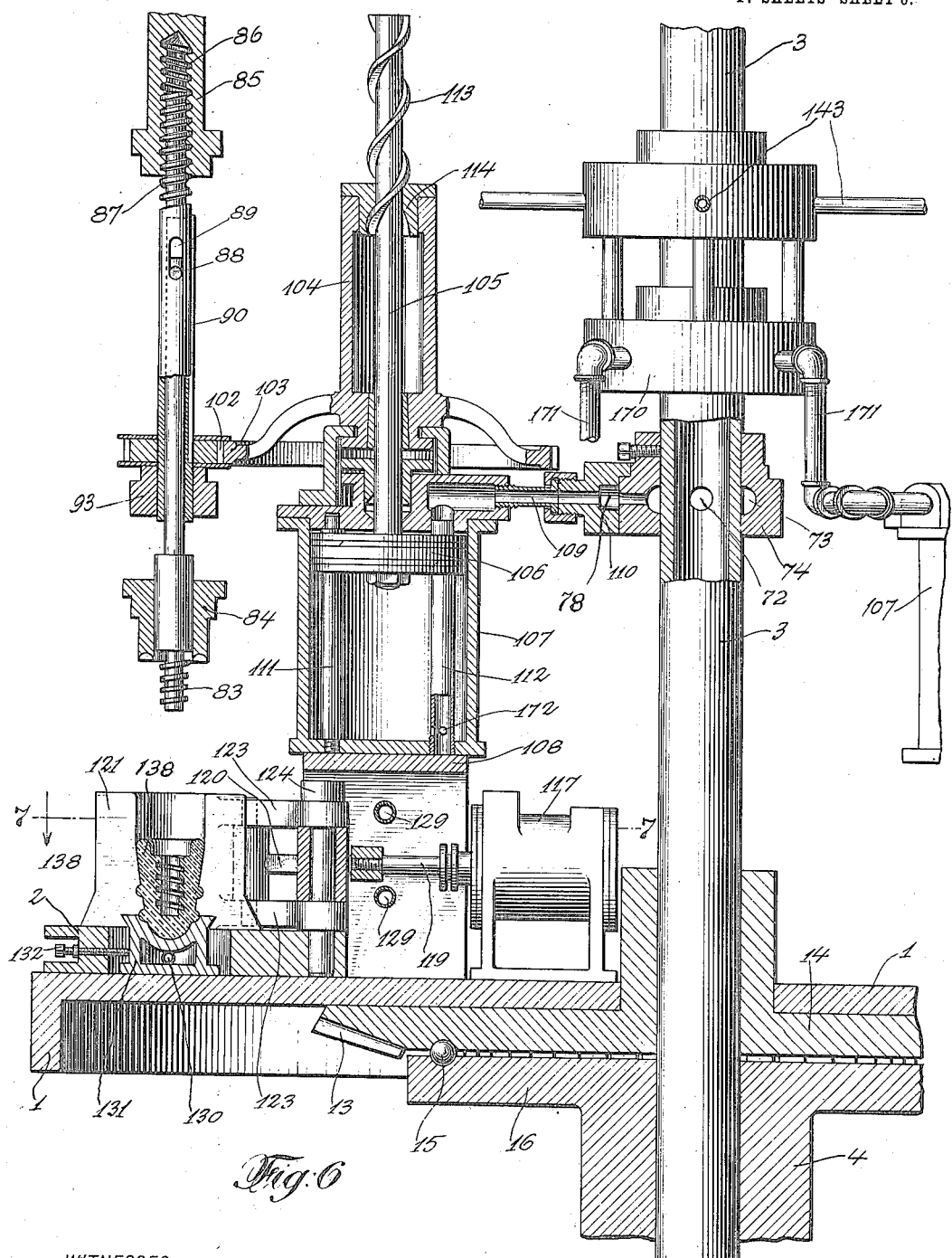
Figure 30:
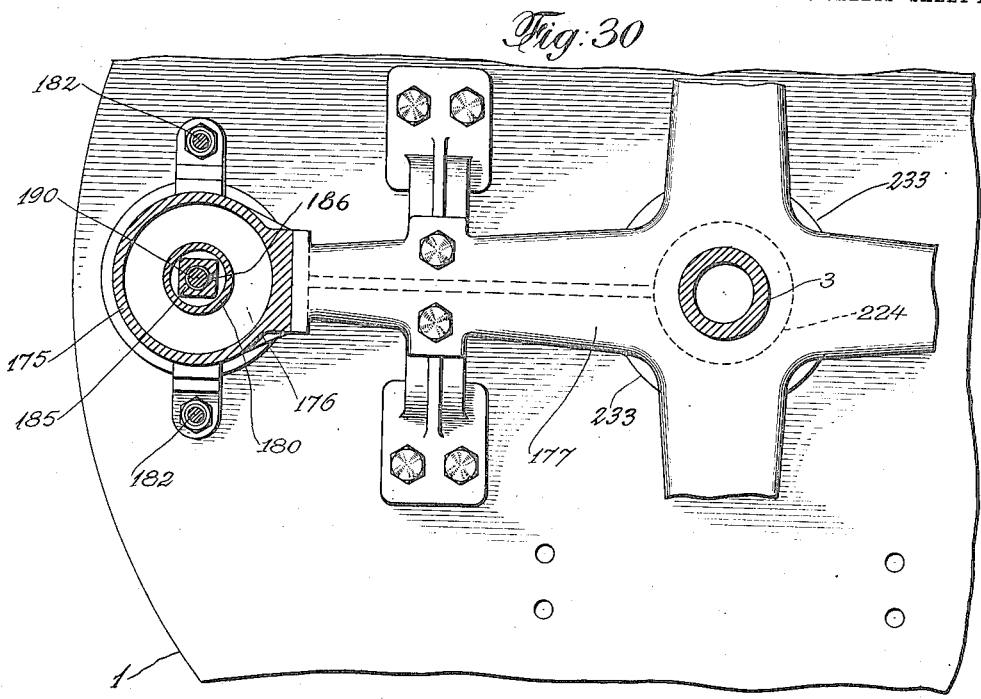
Figure 31:
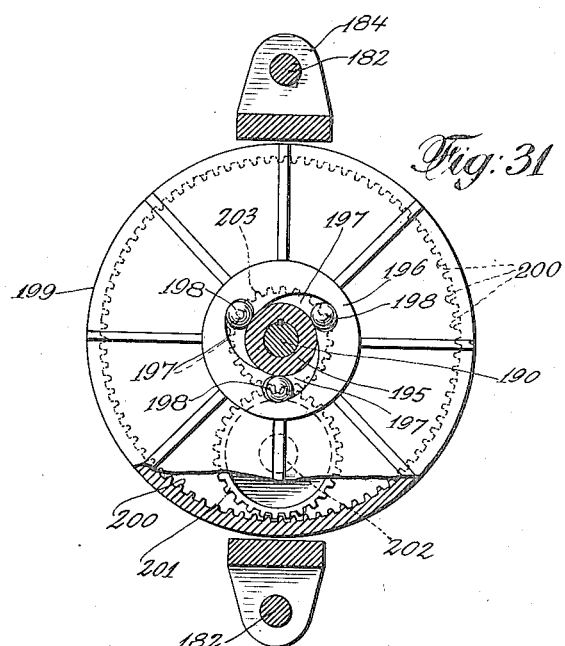
Figure 34:
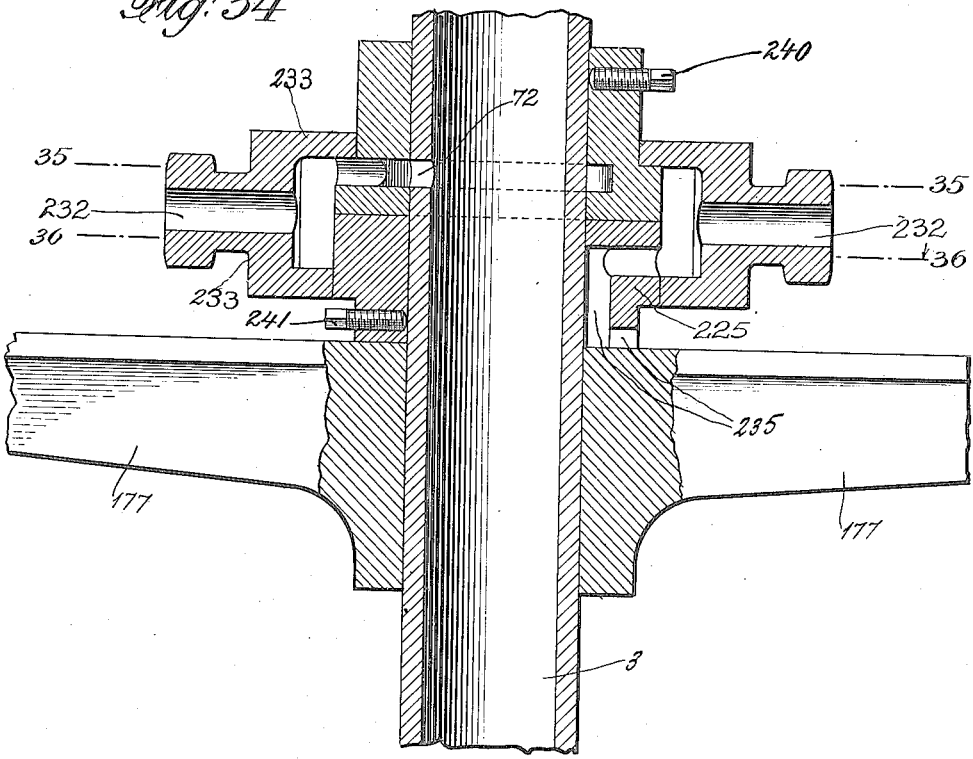
Figure 35:
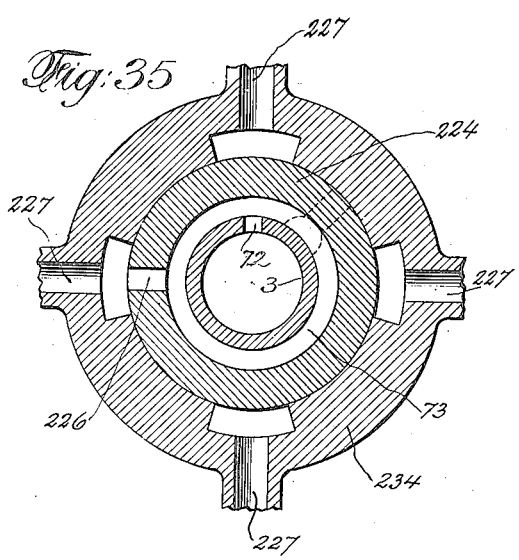
Figure 36:
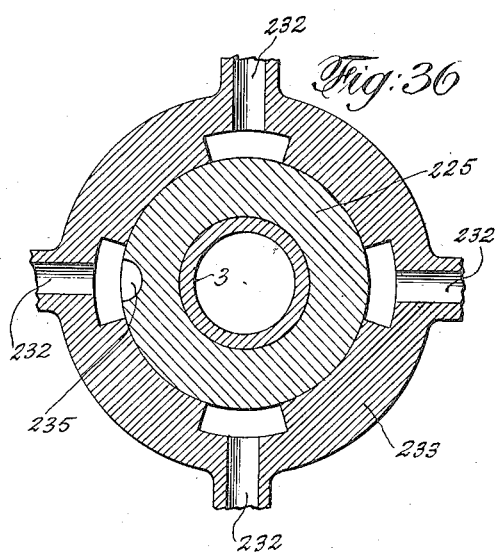

Referring to the specific embodiment of my invention shown in the drawings, which accompany this application and form part hereof, Figure 1 is an elevation of the complete machine with parts broken away and certain parts omitted for sake of clearness. Fig. 2 is a vertical section of the machine with parts shown in elevation, a section being taken on line 2—2 of Fig. 3. Fig. 3 is a horizontal section taken on the line 3—3 of Fig. 1 and with most of the detail mechanism omitted for sake of clearness and also showing the devices for carrying the molten glass from the furnace to the molds. Fig. 4 is a horizontal section on line 4—4 of Fig. 1. Fig. 5 is a section on line 5—5 of Fig. 1. Fig. 6 is an enlarged detail vertical section of a mold and the lower portion of the screw plunger and its operating devices. Fig. 7 is an enlarged detail section on line 7—7 of Fig. 6. Fig. 8 is an enlarged detail elevation of the mold and its cooling pipes. Fig. 9 is a horizontal section on line 9—9 of Fig. 8 through the bottom part of the mold. Fig. 10 is an enlarged detail plan with parts in section of the mold and devices for removing the insulator from the mold and placing it upon the carrier. Fig. 11 is an enlarged detail plan section of part of the devices for removing the insulator from the mold. Fig. 12 is an elevation of the devices for removing the insulator from the mold. Fig. 13 is a front elevation of the devices for carrying molten glass from the furnace to the mold. Fig. 14 is a vertical section of the same on the line 14—14 of Fig. 13. Fig. 15 is a plan of the same. Fig. 16 is a detail of the piston operating the device for carrying the molten glass from the furnace to the mold. Figs. 17 and 18 are details of the operating valve of the said piston. Fig. 19 is a detail horizontal section through one of the rotary air valves operating the different pistons. Figs. 20–26 are diagrammatic representations showing the operating cycle of the rotary air valves of the pistons. Figs. 27 to 36 inclusive illustrate a modified form of my invention. Of these, Fig. 27 is a view partly in elevation and partly in section showing the screw plunger and mold operating devices of such modified form of construction. Fig. 28 is an elevation partly in section showing the screw plunger and its operating devices in the position when the screw plunger is inserted in the molten glass in the mold. Fig. 29 is a vertical section of the same parts with the screw plunger and connecting parts in their uppermost positions. Fig. 30 is a horizontal section on line 30—30 of Fig. 27, with certain parts omitted. Fig. 31 is an enlarged horizontal section on line 31—31 of Fig. 28. Fig. 32 is a detail plan view of the cylinder and connecting parts. Fig. 33 is a detail of the cross head. Figs. 34, 35 and 36 are enlarged details of the rotary air valve.

My improved press is preferably entirely automatic, most of the operations being performed through the pressure of compressed air. I have shown my improvements as embodied in the drawings in connection with a turn table press provided with four molds, although it will, of course, be understood that any suitable press may be employed and any suitable number of molds may be used.

1 is the rotary turn table upon which are mounted four molds 2, 2. Turn table 1 rotates around a hollow stand-pipe, fast in stationary standard 4 rooted to the base plate 5 of the press, the source of supply of compressed air represented by pipe 6, which may connect with any suitable means for supplying the air under pressure. Pipe 6 is screwed into standard 4 and opens into a hollow space 7 in the bottom of the standard, which communicates with the hollow interior of stand pipe 3.

8 is a hand wheel for a valve in pipe 6 to control the supply. Pipe 6 is also supported, as shown by support 9, secured to the base plate. The compressed air is supplied to the interior of stand pipe 3 through pipe 6 under such pressure and in such amounts as may be desired. From stand pipe 3 it passes to the various valves for operating different parts of the apparatus, as will be presently described.

10 is the main driving shaft, receiving power through pulley 11 from any source of power. Turn table 1 is rotated from this shaft through bevel gear 12, meshing with a circular gear 13, cut on circular plate 14 bolted to the under side of the base of the rotary turn table (see Fig. 2). Ball bearings 15 are interposed between plate 14 and stationary plate 16 forming the upper part of standard 4.

17 is a worm on shaft 10 meshing with a worm wheel 18 fast on shaft 19, the shaft carrying at its other end a wheel 20, around which passes an endless chain or carrier 21 for removing the finished insulators, as will be later described. Motion is transmitted to the endless carrier through the worm wheel and wheel 20. The endless chain 21 is only shown in part.

Molten glass may be supplied to the molds in any suitable manner by hand or by any suitable means. The devices shown for this purpose are particularly illustrated in Figs. 1, 3, 4, 5 and 13 to 18 inclusive. Molten glass is supplied from a furnace (not shown) and drops upon one of the curved surfaces 22 of a rotary wheel 23, mounted on a sleeve 24, loose on shaft 25, carried in any suitable supports (not shown). An intermittent rotary motion is given to wheel 23 by means of a toothed sector 26, loose on shaft 25 and carrying a pawl 27 adapted to engage with the teeth on toothed wheel 28, fast on sleeve 24, sector 26 engaging the teeth of a rack 29 on the end of piston rod 30 secured to piston 31, working in cylinder 32. Spring 33, surrounding rod 30 and lying between a cap 34 at the open end of the cylinder 32 and the piston 31 tends to keep the piston 31 in the lower end of cylinder 32, as shown in Fig. 16. The piston 31 is moved upward to rotate wheel 23 by compressed air. This is supplied from pipe 6 through small pipe 35, see Fig. 2, provided with a valve 36, pipe 35 opening into chamber of cylinder 37.

38 and 39 are two valves for ports 40 and 41. Valves 38 and 39 are mounted on a rod 42, which carries at its end a roller 43, held in engagement with the periphery of turn table 1 by means of a spring 44 lying between the end of cylinder 37 and the collar 45 secured to the rod. Normally the valves are in the position shown in Fig. 18, with valve 38 closing port 40. Whenever roller 43 engages a short cam 46 on the periphery of turn table 1, see Fig. 3, rod 42 is pushed inward, opening port 40 and closing port 41. The compressed air now rushes in from pipe 35 and chamber 36 through port 40, into chamber 47 and through orifice 48 into cylinder 32 below piston 31, forcing the piston up and causing rack 29, through sector 26 and pawl 27, to rotate ratchet wheel 28 and wheel 23 one point. As shown, this is one-third of a revolution. A cam 46 is provided for each mold and is so placed, see Fig. 5, that wheel 23 will be given this partial rotary movement when a mold is brought into proper position to receive molten glass. This position is indicated in Fig. 3 by the mold at the left side of the figure. Each cam 46 is made just long enough to give the sufficient amount of compressed air to force piston 31 to the limit of its stroke. When the roller 43 passes off the cam, spring 44 closes port 40 and opens port 41. This permits the air below piston 31 to pass out into chamber 48 of cylinder 37, which is open to the air. Thereupon spring 33 returns piston 31 to its normal position. The consequent downward movement of rack 29 will turn sector 26 backward, but this will not affect wheel 23, as pawl 27 will slip idly over the teeth of gear wheel 28. At the proper time an intermittent feed is thus given to wheel 23. The flow of molten glass into the curved or cup surfaces 22 of the wheel will be regulated, of course, as desired.

Each charge of molten glass will be discharged from a cup surface 22 into trough 49, whence it will slip onto piece 50, which is practically a continuation of the trough and thus onto a piece 51 secured to the mold for guiding the molten glass into the mold itself. Piece 51 is only diagrammatically represented, see Fig. 1, as it is a well known construction. Piece 50 is secured at 52 to a bracket 53, secured to the framework. Piece 50 can be adjusted on center 52 to suit different heights of molds. As shown, a space is preferably left between parts 49, 50 and 51 for the escape of water and other foreign material. Any suitable means of cooling the surfaces over which the molten glass passes may be used. As shown, I have indicated a hollow space 54 in the interior of wheel 23 and a hollow space 55 in the interior of trough 49 to receive any suitable cooling substance.

56 is a scraper for holding back any excess of molten glass. It is mounted on a sliding piece 57 having a hollow space 58 to receive a cooling fluid, sliding piece 57 being carried at each end on a square piece 59 adapted to slide in guideways 60 formed between the part of the body of trough 49 and a rail 61 secured to it, as shown in Fig. 14.

62 is a bracket secured to trough 49 and having a cup-shaped part 63. There are two of these brackets 62. In the cups 63 of the brackets rest studs 64 projecting from both sides of a block 65 fastened to the lower part of rod 66. The upper end of the rod carries a block 67, to which, at 69, is pivoted an arm 68. Arm 68 is fast to sliding piece 57.

70 is a spring encircling rod 66 between block 67 and a bracket 71, through which rod 66 passes and which bracket forms a bearing for it. In case any hard foreign substance, or any hard lump of glass presses against scraper 56, breakage of the parts is avoided by the above arrangement, the scraper with sliding piece 57 being free, under sufficient pressure, to slide downward in the guideway 60, rod 66 rocking to the right, as viewed in Fig. 14, in such operation. When the obstruction has passed, spring 70 will restore the parts to their normal positions.

The steps of forcing the screw plunger into the molten glass in the mold bringing down the former, withdrawing the former and screw plunger, opening the mold, removing the insulator therefrom, closing the mold and restoring the parts generally to their original positions are performed by apparatus actuated by the compressed air. These various steps are taken in certain predetermined order. As shown, the different sets of apparatus are actuated by compressed air by means of a series of valves which are opened and closed in a predetermined order. Figs. 20 to 26 inclusive represent diagrammatically the operation of such valves and the sequence of their operation. I will now describe them in the order in which they are performed in the operation of the machine. After the glass has been received in the mold, the first step is to bring down the former and screw plunger and force the latter into the molten glass in the mold. The apparatus for accomplishing this is especially illustrated in Figs. 1, 2, 3, 6, 19 and 20. The stand pipe 3 has a series of outlets 72, 72 leading into an annular chamber 73, formed in a series of rings 74 surrounding the stand pipe at each valve. These rings are fast to the stand pipe and do not rotate. Each chamber 73 has a single orifice or outlet 75. It has also on its outer surface a passageway 76, which communicates at its lower end with the atmosphere, as shown at the top of Fig. 2. A series of valves are provided for permitting compressed air to pass from the stand pipe to the different pistons, which operate different parts of the apparatus.

77 is the one of these valves used in forcing the former and screw plunger into contact with the glass. It is secured to the upper part of the rotary turntable, as shown in Fig. 2 and rotates with that table. In the rotation of the turn table, after molten glass has been put into a mold, the outlet 78, in valve 77, comes opposite outlet 75 of ring 74. Connecting with outlet 78 is a pipe 79 connecting with an inlet 80 leading to the upper part of cylinder 81 above piston 82 of the cylinder. When outlet 78 reaches outlet 75, piston 82 is in the upper part of cylinder 81. The compressed air rushes in and forces down the piston. This forces down the screw plunger 83, causing it to enter the molten glass in the mold to form the screw of the insulator. It also forces down the former 84.

The shaft of the screw plunger is composed of three parts, the upper part 85, secured to piston 82 and provided at its lower end with interior screw-threads 86, the portion 87 screw-threaded and fitting into the interior screw threads 86. Pin 88 is secured to the upper end of plunger 83 and projects sidewise through a slot 89 in a third part 90 of the shaft of the plunger. Part 85 has secured to it a bracket 91 (see Fig. 1), with two downwardly projecting rods 92, 92 carrying at their lower end a similar bracket 93. Surrounding each of the rods 92 is a loose sleeve 94, each having a collar 95 at its upper end, between which and bracket 91 is a spring 96. Both the rods 92 and sleeves 94 pass through an opening in a bracket 97, secured to one of the uprights 98 between the base and upper part of the turn table. Bracket 93 also has two downwardly projecting pins 99. Loosely mounted upon these, at their lower end, is a cross-piece 100, to which the former 84 is secured. A spring 101 encircles each pin 99. These permit the former to stop in its downward movement before the plunger shaft ceases its downward movement in case an excess of glass has been put into the mold. The outlets 78 and 75 are so adjusted in size that in the regular rotation of the turn table the outlet 78 will have passed outlet 75 by the time sufficient air has been admitted to cylinder 81 to force the screw plunger and the former down into the mold in the proper way. Immediately after sufficient air has been admitted for this purpose, the forward end of outlet 78 comes into line with exhaust outlet 76, whereupon the compressed air in cylinder 81 exhausts into the atmosphere. As this takes place, the former 84 is immediately lifted a slight distance from the molten glass by means of the springs 96 which had been compressed in the downward movement of the parts. This prevents injury to the molten glass from too long a contact between the former and the glass. The operation of these springs also, of course, slightly lifts piston 82.

It will, of course, be understood that each mold is provided with its cylinder 81 and pipe 79 connecting with valve 77, each cylinder 81 in turn receiving its charge of compressed air through its pipe 79. In Fig. 20, only one of the outlets 78 is shown, but it will be understood that, of course, there are three others, each connecting with a pipe 79. This is illustrated in Fig. 19, where valve 77 is shown in section as circular and is provided with four outlets 78 connecting with the four pipes running to the cylinder.

The screw plunger remains in the glass in the mold until the insulator is sufficiently cooled and set and is then withdrawn by unscrewing it. The means shown for unscrewing the screw plunger are particularly illustrated in Figs. 2, 4, 6 and 22. In order to permit the screw plunger 83 to be unscrewed, I have placed the interior screw-threads 86 in part 85 of the screw plunger shaft and have mounted on part 90 the gear 102. This gear meshes with a large gear 103 fast on a cylinder 104, through which passes piston rod 105 secured to piston 106 working in cylinder 107. This cylinder is supported on a standard 108 upon the base of turn table 1. A pipe 109 connects the upper end of cylinder 107 with a valve 110, which is in all respects like valve 77, which encircles and rotates around another ring 74 fast on stand pipe 3, in the manner already described. This ring 74 is the fifth one from the top, as shown in Fig. 2 and it is similarly provided with an outlet 75 and an exhaust 76. Only in this case the location of outlet 75 is located at the position after the turn table has made one-half a revolution at the beginning and the exhaust 76 where it has made three-quarters of a revolution. When the opening 78 of valve 110, in the rotation of the table, comes opposite the outlet 75, compressed air rushes through pipe 109 into the upper part of cylinder 107 and forces piston 106 downward. Piston 106 is provided with two openings, through which pass rod 111 and pipe 112 secured to the two ends of the cylinder 107. Among other things, these pipes prevent any rotation of piston 106 and piston rod 105 on their axes. Piston 105 at its upper end with screw threads 113, which engage with interior screw threads in the head 114 of cylinder 104. Accordingly, as the piston and piston rod descend, a rotary motion is given to cylinder 104 and gear 103. This rotates gear 102 and sleeve 90 and through pin 88 in slot 89 rotates the screw plunger 83. The screw threads 86 are made to correspond with those of the screw plunger 83 and this rotation, accordingly, raises the screw plunger out of the molten glass in the mold without placing any stress upon the glass itself. The purpose of having the screw plunger in its lower portion composed of two parts, the sleeve 90 and the inner shaft of the screw plunger itself and to have them connected by a slot and pin connection, is to lift the former 84 from the glass immediately after the screw plunger has been forced into the glass.

The unscrewing of the screw plunger takes place, as shown in Fig. 5, when the mold is one-half way around the table or in the position of the mold shown in the upper part of Fig. 5. The compressed air is shut off from the upper part of cylinder 107 as soon as enough has been admitted, but it is retained there until the table has rotated one additional quarter of its revolution, when opening 78 is brought opposite exhaust 76, as shown in Fig. 22. The air is then exhausted from the upper part of cylinder 107 into the atmosphere, permitting subsequent operations to take place as hereinafter described.

The next operation is to raise the screw plunger as a unit to its highest position. The previous operation has merely lifted the screw plunger 83 slightly above the insulator. It is necessary to raise it still higher, into the position shown in Fig. 1 at the left, for example, in order to permit a fresh batch of molten glass to be put into the mold at the proper time. The devices for thus raising the screw plunger are particularly illustrated in Figs. 1, 2, 3 and 21. This is accomplished by admitting compressed air into the cylinder 81 on the under side of piston 82. The lower side of the cylinder connects with pipe 115, which connects with outlet 78 in valve 116, being the second valve from the top shown in Fig. 2. This has a corresponding ring 74 secured to stand pipe 3 and provided with an outlet 75 and an exhaust opening 76 in the same manner as already described, except that the locations of the outlets are different and are as shown in Fig. 21. In this case the exhaust outlet 76 is arranged so as to connect with opening 78 at the same time that the outlet 75 is in line with outlet 78 of valve 77. Thus as compressed air rushes into the upper part of cylinder 81, the air on the under side of piston 82 is exhausted in the air. After the table has rotated slightly beyond the position of the third mold shown in Fig 5 for the one at the top and opening 78 of valve 116 reaches the opening 75 of its ring 74, compressed air rushes in through the pipe 115 on the under side of cylinder 82, forcing it upward and thus raising the screw plunger in its connecting parts, including the former. Outlets 78 and 75 remain in engagement long enough to permit sufficient compressed air to be admitted to force the piston 82 into its uppermost position, when the supply is shut off. The air, however, between the piston 82 is confined until in the continued rotation of the table outlet 78 of valve 116 again comes opposite its exhaust opening 76, which will be in the next operation of the mold.

The next operation that is performed in the rotation of the turn table is to open the mold to permit the insulator to be removed. This is especially illustrated in Figs. 1, 2, 5, 7, 8, 9 and 24. This is done by means of a cylinder 117 containing a piston 118, whose piston rod 119 is connected by a fork 120 with the two sides 121, 121 of the upper part of the mold. Each upper half of the mold has a slot 122 in an arm 123, the arms being pivoted to a fixed stud 124 secured to the base of the rotary time table. A pin 125, at the end of each branch of the fork, passes through the slot 122. In the position of the piston 118, shown in Figs. 2 and 7, the two halves of the mold are held tightly closed together. They are opened by the admission of air under pressure at the left-hand side of the piston 118, as viewed in Figs. 2 and 7, through pipe 126 from that end of the cylinder communicating with the outlet 78 of valve 127, that valve being the next to the lowest shown on stand pipe 3 in Fig. 2. This takes place after the mold, under discussion, has reached a position midway between the third and fourth positions shown in Fig. 5 and as shown by the position of the outlet 75 of Fig. 24. When this point is reached, piston 118 is moved to the right, as viewed in Figs. 2 and 7 and the two upper halves of the mold are open. The compressed air is confined in the cylinder 117 at the left of the piston until the exhaust point 76 of Fig. 24 is reached, at which time the mold is again closed, as will be presently described, by the admission of air on the right-hand side of the piston 118 and the exhaust from the left. In Fig. 7 the molds are shown as hollow, provided with interior spaces 128 and with pipes 129 for the admission of the cooling fluid to cool the molds. In Fig. 9 is illustrated the lower solid part of the molds, 131, 132, 132 being the usual centering screws. 130 are pipes connecting with the interior of the lower solid part of the mold for furnishing a cooling fluid.

The next operation, in order of time, is the removal of the finished insulator from the mold. This may be accomplished in any suitable manner. I show means actuated by pneumatic pressure for doing this automatically and for depositing them upon the endless carrier 21 for removal to the leer or other suitable place. The devices for this purpose are particularly illustrated in Figs. 1, 2, 5, 10, 11, 12 and 26. Shortly after the upper halves of the molds have opened, a fork 133 on the end of piston rod 134, secured to a piston 135 in a cylinder 136, is moved inward toward the finished insulator 138, the fork entering in the hollow between ribs 137 formed on the insulator, as shown in Fig. 12. Thereafter, cylinder 136 is rotated a half revolution on its center, fork 133 lifting the insulator and turning it over and depositing it with the head upward, as shown in Fig. 12, upon the endless carrier 21. Thereafter, piston 135 is retracted, withdrawing the fork from the insulator and the cylinder is turned back into its original position. Cylinder 136 has circular studs 139, one on each side, extending into a bearing in frames 140, 140 on each side. These side frames are secured to the bed-plate of the rotary table 1 and revolve with it. Each mold is, of course, provided with a similar cylinder 136. A spring 141 encircling piston rod 134 and bearing against the piston at one end and against the end of the cylinder at the other end tends to keep the piston 135 in the position shown in Fig. 10, or in other words, at its inner end and with the fork 133 withdrawn from the mold. The piston 135 is moved to the other end of the cylinder by means of a valve 142, shown in Fig. 26, and also shown as the third valve from the top in Fig. 2. After the mold has passed a little more than half way between the third and fourth positions shown in Fig. 5, an opening 78 in valve 142 comes opposite opening 75 in its ring 74, compressed air is admitted from valve 142 into pipe 143, which runs it and connects with an inlet 144 in the casing of cylinder 136. Inlet 144 connects with the end of the cylinder away from the turn table. The compressed air forces the piston 135 against spring 141 to the further end of the cylinder, until fork 133 grasps the insulator, as already described. Immediately after this has taken place, cylinder 136 is rotated a half revolution on the studs 139 and the bearings in the side frames 140. This movement is effected through piston 145 in cylinder 146 mounted on a stationary bracket 147 fast to the stationary standard 4.

148, 148 are two piston rods secured to piston 145 and carrying at their outer end a rack bar 149 provided with teeth on its upper surface. This rack bar has its teeth curved to correspond with the arc of circles, having the center of the turn table as their center. This rack bar is supported on a table 150 carried on bracket 147, the table being provided with guideways 151, in which downwardly projecting portions 152 of rack bar 149 projects. The rack bar is free to reciprocate in the guideway of table 150, as piston 145 reciprocates in its cylinder. The piston is normally in the position shown in Fig. 11, that is, it is at the end of the cylinder farther from the turn table. The piston 145 is moved to the other end of the cylinder whenever roller 153, on the end of rod 154, enters the cut-away cam surface 155 of the rotary turn table. Such a cut-away cam portion is provided, of course, for each mold, one of these being shown in Fig. 5 and Fig. 11. Rod 154 is supported in a bearing 156 secured to table 150 and passes through stuffing box 157 in the end of a small valve cylinder 158 on the side of cylinder 146 and carries at its end, inside of said valve cylinder, a valve 159, provided with a chamber 160. Spring 161, surrounding rod 154 between the end of cylinder 158 and a collar 162 on the rod, tends to hold roller 153 in engagement with the periphery of the rotary turn table 1. When roller 153 enters the cut-away portion 155, valve 159 is moved from the right-hand position which it occupies, as shown in Fig. 11, to the left. This connects the right-hand end of cylinder 146 by means of a passageway 163 with the interior chamber 164 of valve cylinder 158 and connects the other end of cylinder 146 by a passageway 165. This chamber and chamber 160 with exhaust 166, of course, connects with the air.

Air, under pressure, is supplied to chamber 164 from pipe 6 through pipe 35, controlled by valve 36. This pipe is shown at its two ends in Fig. 2 and Fig. 10, the connecting parts not being illustrated. Piston 145 is thus moved to the left, moving rack 149 in the same direction. By this time the turn table has brought the right-hand frame 140 over the rack 149, bringing into mesh with rack 149 the teeth of gear 167, mounted on the rotary turn table. This latter gear meshes with gear 168 mounted above it on the framework and the latter with gear wheel 169, which is fast with the right-hand stud 139. About the time gear 167 meshes with rack 149, the rack 149 begins its movement to the left or toward the rotary turn table. This rotates gears 167, 168 and 169 and rotates cylinder 136 on its center, until the cylinder has completed a half revolution, bringing the insulator 138 into the position shown in full lines in Fig. 12. By this time rack 149 has completed its movement to the left. The insulator is deposited upon the endless carrier 21. At the same moment the air in cylinder 136 behind piston 135, and which is holding that piston at the end of the cylinder nearer the rotary turntable, is exhausted through exhaust port 139ª into line with which passageway 144 is brought immediately upon the completion of said semi-circular movement of cylinder 136 and spring 141 immediately retracts piston 135 and fork 133, withdrawing the latter from contact with the insulator. This movement is timed to take place the moment the insulator is set down upon carrier 21. About as this is accomplished cut-away portion 155 of the table passes from opposite roller 153, whereupon rod 154 and valve 159 are forced to the right again, into the position shown in Fig. 11. This connects passageway 165 with chamber 164 and causes the air to run in to the left of cylinder 146 and at the same time connects passageway 163 with exhaust 166. Piston 145, accordingly, is forced to the right, taking with it rack 149 and through gears 167, 168 and 169 cylinder 136 is rotated back to its original position, ready for the next operation.

The next operation, in point of time that takes place, is the screwing down of the lower part of the screw plunger into its normal position to be ready for the next molding operation. The devices for accomplishing this are especially illustrated in Figs. 1, 2, 4, 6 and 23. This operation takes place when the mold in question has slightly passed the fourth or right-hand position shown in Fig. 5 and by the outlet 75 in Fig. 23. Valve 170, being the fourth valve from the top in Fig. 2, connects by a pipe 171 with the upper end of pipe 112 inside of cylinder 107. When opening 78, in valve 170, is opposite outlet 75 in its ring valve 74, compressed air passes through pipe 171 and pipe 112 and through an orifice 172 at its lower end into the lower portion of cylinder 107 and forces piston 106 upward. Through piston rod 105 and screw-threads 113 and 114 and cylinder 104 this movement rotates gear wheel 103 in the reverse direction to that in which it was rotated when the screw plunger was unscrewed from the molten glass in the mold. Through gear 102, on sleeve 90 of the screw plunger, it rotates that sleeve and with it screw 87, screwing the parts 90 and 87 down in the part 85 of the screw plunger, bringing the screw plunger into the same position it occupied before the beginning of the molding operation which I have described.

The next operation is to close the mold to prepare it to receive molten glass for the next operation. The devices shown for accomplishing this purpose are especially illustrated in Figs. 1, 2, 5, 7, 8, 9 and 25 and have been already partly described. It is the reverse operation to that of opening the mold. This operation is accomplished through valve 173, being the lowest valve shown in Fig. 2. This operation takes place when the opening 78 of this valve passes outlet 75 in its ring valve 74 at the place shown in Fig. 25, that is, midway between the fourth and first positions of the mold in Fig. 5 or as the mold is approaching the place to receive a fresh batch of molten glass. When this point is reached, air passes into the right-hand end of cylinder 117, through an opening 174 in the cylinder, communicating with outlet 78 of valve 173. Accordingly, piston 118 is forced to the left, as viewed in Fig. 2 and Fig. 7, closing the two upper halves of the mold. The mold and all other parts are now in readiness for a repetition of the operation.

It will, of course, be understood that the above description which has been given specifically as to the operations connected with one mold on the table, applies equally to all of the molds on the table, each mold and its connecting parts passing successively through the same steps.

The modification illustrated in Figs. 27 to 36 represents a construction in which but one cylinder is employed for forcing the screw plunger into the molten glass in the mold, unscrewing it from the insulator in the mold and raising it to its normal position. Referring to such modification, 175 is the cylinder and 176 its piston. It is suitably mounted on the bracket 177, extending from the central stand-pipe 3, see Fig. 27. 178 is the screw plunger and 179 the former. The piston rod of piston 176 is a hollow cylinder 180 carrying at its upper and outer end a cross bar 181, to which are secured downwardly extending rods 182, 182. These are supported and guided in openings in brackets 183, 183, secured to the framework of the cylinder and in openings in brackets 184, 184 similarly secured to the cylinder. As the piston 176 rises and falls in the cylinder, so the rods 182 rise and fall in their bearings. Inside of cylinder 180 is a movable square nut 185, which nut passes through piston 176 and has a groove 186 in its outer wall, permitting the passage of air between small cylinder 180 and large cylinder 175 below the piston. Nut 185 is loosely mounted in the piston 176 and has a cap 187 at its lower end and a cap 188 at its upper end. As the piston moves upward, it strikes cap 188 and carries the nut upward and when the piston moves downward it strikes the lower cap 187 and moves the nut downward. Nut 185 is screw-threaded on its interior to correspond with screw-threads 189 on a rod 190 in the interior of cylinder 180. This rod has a circular piece 191 at its upper end, fitting the interior of cylinder 180. It passes through the center of the lower end of the cylinder 175 and is free to revolve, but is prevented by collar 192 and stuffing box 193 from any vertical movement in the cylinder. At its lower end it passes through a bearing in plate 194 secured to bracket 184. At its lower end rod 190 has fast to it a circular ring 195. Surrounding this ring is a circular ring 196 containing three pockets 197, each containing a ball 198. The pockets 197 are shaped in the usual way, large at one end to contain the ball and sloping to make the pocket narrower at the other end, so that if the rod 190 revolves in one direction, the balls will rotate loosely in their pockets, but if it rotates in the other they will be driven to the narrower portions of the pockets and rotate ring 196, communicating rotary motion to the larger inverted gear wheel 199, with which ring 196 is made integral. Gear wheel 199 is provided with interior gear teeth 200, as shown in Fig. 29. These teeth mesh with the gear wheel 201, loosely mounted on stud 202, secured to frame 184. Gear 201 meshes with a small gear 203 fast on rod 204, mounted centrally in a bearing in bracket 184 and in line with rod 190. When piston 176 moves downward, the balls 198 will turn idly in their pockets, but when piston 176 rises, the balls will grip ring 196 and rotate rod 204. This will rotate screw plunger 178, unscrewing it from the insulator in the mold as the upper part 205 of screw plunger 178 forms a sleeve surrounding rod 204 and the two are connected by a feather or spline 206. The screw plunger and its sleeve are thus free to move vertically on rod 204, but any rotary movement of the rod rotates the screw plunger.

The screw plunger 178 and former 179 are pressed straight downward into the glass in the mold when piston 176 moves downward. This is done through rods 182, which carry at their lower end a bracket 207. This is fast to a sleeve 208 surrounding sleeve 205 and it is provided at its lower end with a ring 209 adapted to engage with a ring 210 fast on sleeve 205 when the parts move downward. Former 179 is loosely carried on nuts 211, 211 secured to the lower end of rods 212, 212, which pass loosely through holes in the former and through openings in downwardly projecting extensions 213 from bracket 184.

214, 214 are springs encircling rods 212 and adapted to be compressed between collars 215, 215 fast in the upper ends of the rods and the lower part of extensions 213 when the rods are moved downward.

216, 216 are the usual springs encircling the rods carrying the former to permit the former slight vertical play should the amount of glass vary that is put into the mold.

217, 217 are collars fast on rods 212. They lie in the path of the circular ring 209 of sleeve 208 and are forced downward, carrying with them the rods 212, when rods 182 are depressed.

As soon as piston 176 has reached the lower limit of its travel, the air is exhausted above it and it is moved slightly upward by reason of springs 218, 218 encircling rods 182, these springs having been compressed in the downward movement between nuts 219, 219 fast on rods 182 and a loose circular ring 220 on each rod. These rings normally lie on collar 221 fast on each rod, but in the downward movement of the parts, while the collar 221 can pass through the openings in rings 222, 222 fast on bracket 184, the loose ring 220 is caught by the rings 222 and the springs 218 are compressed, as shown in Fig. 28. As soon as the piston 176 and its rods 282 are thus moved slightly upward, the pressure of ring 209 is removed from collars 217, whereupon springs 214 raise the former away from the molten glass of the insulator a slight distance. The screw plunger 178 remains in the glass in the mold a short time longer and is then screwed upward. This is caused by the upward movement of the piston 176 through nut 185, screw 189, rod 190 and the ball clutch and connections heretofore described.

The nut 185 permits a slight upward movement of the piston 176 before the unscrewing of the screw plunger from the glass begins. This permits the former to be raised from the glass almost immediately after it has been brought into contact with it and permits the screw plunger to remain as long a time as required for the setting of the glass around it.

223, 223 are ports in the ring 191 to permit the free movement of cylinder 180 up and down on rod 190.

Figs. 34, 35 and 36 illustrate the valves for admitting air pressure to cylinder 175.

224 represents an inlet valve and 225 its outlet valve. It will be understood that a pair of these valves, one inlet valve and one outlet valve, are provided for both the downward and the upward movement of piston 176 and preferably I provide a similar pair for each piston and each cylinder used in my modified form of apparatus. I have only shown one such cylinder and piston, namely, 175 and 176 and their connecting parts, but the other cylinders and their pistons and valves are similarly arranged.

Referring to the pair of inlet and outlet valves 224 and 225 used for driving piston 176 downward, the main stand pipe 3 is provided with an opening 72 into an outer annular ring 73, just as in the form of machine shown in the main figures of the drawings. Annular chamber 73 is contained within the walls of valve 224, which wall has an opening or outlet 226 adapted to successively engage with the ports 227 in ring 234 connecting with the upper half of the cylinder 175 connected with each mold. Connected to each port 227 is a pipe 228, connecting with a passageway 229 in cylinder 175, which passageway opens into the outer part of the cylinder, as shown in Fig. 27. When ports 227 and 226 are in line, the air pressure forces cylinder 176 downward. At the same time, the air is exhausted from the lower part of cylinder 175 through passageway 230, pipe 231 which connects with a port 232 of ring 233. When port 232 is in line with exhaust port 235, the air exhausts through that port into the air, as shown in Fig. 34.

In Figs. 35 and 36 port 227 is shown in line with port 226 and at the same time port 232 is in line with port 235, so that compressed air is being supplied to the upper part of cylinder 175 and is being exhausted from the lower part, as also indicated in Fig. 27. It will be understood that rings 233 and 234 rotate with the cylinder and turn table. When it becomes necessary to raise the screw plunger, the compressed air will be supplied to the lower part of cylinder 175 through pipe 231 from a valve corresponding with port 226 and port 227 of ring 234, shown in Fig. 35 and air will be exhausted from the upper part of the cylinder 175 through pipe 228 through the exhaust ports 232 and 235 of ring 233, corresponding in all respects with ports 232 and 235 of ring 233, shown in Fig. 26.

It will be understood that each complete valve for admitting air upon one side of the piston and exhausting it from the other side, either when the piston is forced downward or when it is forced upward, consists of two valves or sections which are shown as 233 and 234. The purpose of making each valve in two such sections is to permit the inlet and the exhaust ports each to be adjusted independently of the other.

In Fig. 34, 240 is the adjusting screw for the inlet part and 241 the adjusting screw for the outlet part of the valve.

What I claim as new and desire to secure by Letters Patent, is:—

1. In a glass insulator press, the combination of a mold, a cylinder, a piston, a piston rod therefor, a screw plunger connected with the piston rod and adapted to be screwed upward or downward thereon, a second cylinder, another piston, a piston rod therefor, connections between the piston rod and the screw plunger adapted, when operated, to rotate the screw plunger one way or the other, and means for supplying fluid under pressure to the first cylinder to force the screw plunger straight into the molten glass in the mold, and later to restore the piston rod to its original position, and for supplying fluid under pressure to the second cylinder to cause it to rotate the screw plunger to unscrew it from the molten glass in the mold, and later to screw it down on the piston rod to restore it to its original position relative to the piston rod.

2. In a glass insulator press, the combination of a mold, a screw plunger, and means adapted to be actuated by a fluid under pressure to force the screw plunger into the molten glass in the mold, to unscrew it therefrom, and to restore the screw plunger to its original position.

3. In a glass insulator press, the combination with a screw plunger shaft consisting of two parts, one part carrying the screw and adapted to screw up and down upon the other part, a cylinder connected with a source of supply of fluid under pressure, a piston, a piston rod therefor screw-threaded in part of its length, a gear on the screw plunger shaft, a gear connected with the piston rod of the cylinder and means for causing the reciprocating movement of the piston rod to produce a rotary movement one way or the other of the piston rod gear for the purpose of similarly rotating the screw plunger shaft gear and screwing the screw part of the screw plunger away from or toward the other part of the screw plunger shaft.

4. In a glass insulator press, the combination with a screw plunger shaft consisting of two parts, one part carrying the screw and adapted to screw up and down upon the other part, means for moving the screw plunger as a whole to force the screw straight into the molten glass in the mold, a cylinder connected with a source of supply of fluid under pressure, a piston and a piston rod therefor, and connections between said piston rod and the part of the screw plunger shaft carrying the screw for changing the reciprocating movement of the piston rod into a rotary movement one way or the other for the purpose of screwing the screw part of the screw plunger away from or toward the other part of the screw plunger shaft.

In testimony whereof, I have signed my name to this specification, in the presence of two subscribing witnesses.

FRANK N. ROEHRICH.

Witnesses:
 SIDNEY MANN,
 EDWIN SEGER.